US009235636B2

(12) United States Patent
Stein (10) Patent No.: US 9,235,636 B2
(45) Date of Patent: Jan. 12, 2016

(54) PRESENTING DATA IN RESPONSE TO AN INCOMPLETE QUERY

(71) Applicant: Dropbox, Inc., San Francisco, CA (US)

(72) Inventor: David Stein, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 240 days.

(21) Appl. No.: 13/722,480

(22) Filed: Dec. 20, 2012

(65) Prior Publication Data

US 2014/0181137 A1    Jun. 26, 2014

(51) Int. Cl.
*G06F 17/30* (2006.01)
*G06F 7/00* (2006.01)

(52) U.S. Cl.
CPC .................................. *G06F 17/3064* (2013.01)

(58) Field of Classification Search
CPC ................... G06F 17/30864; G06F 17/30477; G06F 17/30023
USPC .................................................. 707/713, 769
See application file for complete search history.

(56) References Cited

U.S. PATENT DOCUMENTS

| 6,029,245 | A * | 2/2000 | Scanlan | G06F 21/6263 709/203 |
| 6,442,603 | B1 * | 8/2002 | Borella | G06F 17/30905 370/428 |
| 6,735,586 | B2 * | 5/2004 | Timmons | G06F 17/30864 707/999.003 |
| 8,126,868 | B1 * | 2/2012 | Vincent | G06F 17/30893 707/708 |
| 8,140,642 | B1 * | 3/2012 | Kadam | G06F 8/65 709/218 |
| 9,049,176 | B2 * | 6/2015 | Ferdowsi | H04L 67/06 |
| 2006/0080321 | A1 * | 4/2006 | Horn et al. | 707/10 |
| 2008/0091526 | A1 * | 4/2008 | Shoemaker | G06Q 20/10 705/14.55 |
| 2009/0089278 | A1 * | 4/2009 | Poola et al. | 707/5 |
| 2009/0089282 | A1 * | 4/2009 | Qi et al. | 707/5 |
| 2009/0138563 | A1 * | 5/2009 | Zhu | H04W 4/14 709/206 |
| 2012/0030774 | A1 * | 2/2012 | Keith | H04L 63/0428 726/30 |

* cited by examiner

*Primary Examiner* — Pavan Mamillapalli
(74) *Attorney, Agent, or Firm* — Novak Druce Connolly Bove + Quigg LLP (57) ABSTRACT

Disclosed are systems, methods, and non-transitory computer-readable storage media for executing a database query based on an incomplete query. An example system configured to practice the method receives a web request, wherein a uniform resource locator (URL) of the web request provides an argument, and extracts the argument from the URL as a parameter for a database query. The system identifies an unspecified parameter in the database query, and selects a likely value for the unspecified parameter. Then the system executes the database query using the parameter and the likely value, and incorporates at least part of the query result in a web page served in response to the web request. The system can cache the web request and the likely value for the unspecified parameter for later use.

20 Claims, 7 Drawing Sheets

PRESENTING DATA IN RESPONSE TO AN INCOMPLETE QUERY

TECHNICAL FIELD

The present technology pertains to database queries, and more specifically pertains to serving queries that are submitted with missing query parameters.

BACKGROUND

Databases are a powerful and mature tool for storing and retrieving specific data on demand from potentially very large repositories. However, the interfaces for extracting data from various database systems can be complex and intimidating for beginner users or users who are unfamiliar with the specifics of how to form a database query properly. Users who are not database experts often require data from such databases, and rely on experts to obtain or extract that data for them. This is a potentially very inefficient use of a database expert's time, and can cause a bottleneck in users' workflows when requesting data from a database. Some simplified interfaces provide a way for users to access data in the database, but such interfaces may still require information from users that the users do not know. The users are forced to go back to the expert for help, which defeats the purpose of the simplified interface.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Users who are unfamiliar with database query languages can access database information through a simplified interface that allows users to submit query parameters that they know or in which they are interested, such as through a web-based interface. In the case of a web-based interface, the web server receives the query, and passes the query to a query processor. For example, the user can fill out a web form to provide the query parameters or can enter a specific URL that includes embedded query parameters. The query processor can extract or parse the query parameters, and examine them to determine if any are missing. If certain parameters are missing, the query processor can attempt to determine which parameters are missing, and what values those missing parameters should have. For instance, the query processor can examine the information that is provided in the other parameters or can examine other data external to the query, such as a user profile, event data, a query history or cache, and so forth. Then, the query processor can cause the query to be executed on a database. The results of the database query can be provided to the user, such as in a web page, an email, or other form of delivery. In the case of a web page, the format and layout of the results page can vary based on the type and quantity of the results returned from the query.

Disclosed are systems, methods, and non-transitory computer-readable storage media for executing a database query based on an incomplete query. An example system configured to practice the method can receive a web request, wherein a uniform resource locator (URL) of the web request provides an argument, and extract the argument from the URL as a parameter for a database query. Arguments can include database query parameters or parameters describing how to display results, such as a data type, a data category, a time window, a priority, a graph type, a chart type, a table type, or a database. The system can identify an unspecified parameter in the database query, and select a likely value for the unspecified parameter based on at least one of a predefined rule, a heuristic, an analysis of a statistical model, or information contained in the web request. An example statistical model can be based on past user input, user feedback, or log data. The system can select the likely value for the unspecified parameter further based on a data source associated with the database query, such as a production system, a logging module, an analytics module, or some other external source. Then the system can execute the database query using the parameter and the likely value for the unspecified parameter to yield a query result, and incorporate at least part of the query result in a web page served in response to the web request. The system can optionally select a presentation structure for the query result within the web page, wherein the presentation structure comprises at least one of a number of a statistical graphical representation, a layout of the statistical graphical representation, whether to stack the statistical graphical representation, or a type of the statistical graphical representation such as a graph, chart, table, or list. The system can cache the web request and the likely value for the unspecified parameter for later use.

The query results can include additional data related to the web request but not specifically requested through the web request. The system can incorporate specifically requested query results in the web page so that more relevant data is presented in a more visible way than less relevant data, such as by presenting the relevant data in a larger chart, or placing the relevant data in a higher position on the web page.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The disclosed technology addresses the need in the art for providing a simpler and more flexible interface for performing database queries. Users who are unfamiliar with database query languages can access database information through a simplified interface that allows users to submit query parameters that they know or in which they are interested, such as through a web-based interface. In the case of a web-based interface, the web server can receive the query, and pass the query to a query processor. For example, the user can fill out a web form to provide the query parameters or can enter a specific URL that includes embedded query parameters. The query processor can extract or parse the query parameters, and examine them to determine if any are missing. If certain parameters are missing, the query processor attempts to determine which parameters are missing, and what values those missing parameters should have. For instance, the query processor can examine the information that is provided in the other parameters or can examine other data external to the query, such as a user profile, event data, a query history or cache, and so forth. Then, the query processor can cause the query to be executed on a database. The results of the database query can be provided to the user, such as in a web page, an email, or other form of delivery. In the case of a web page, the format and layout of the results page can vary based on the type and quantity of the results returned from the query.

Figure 1:
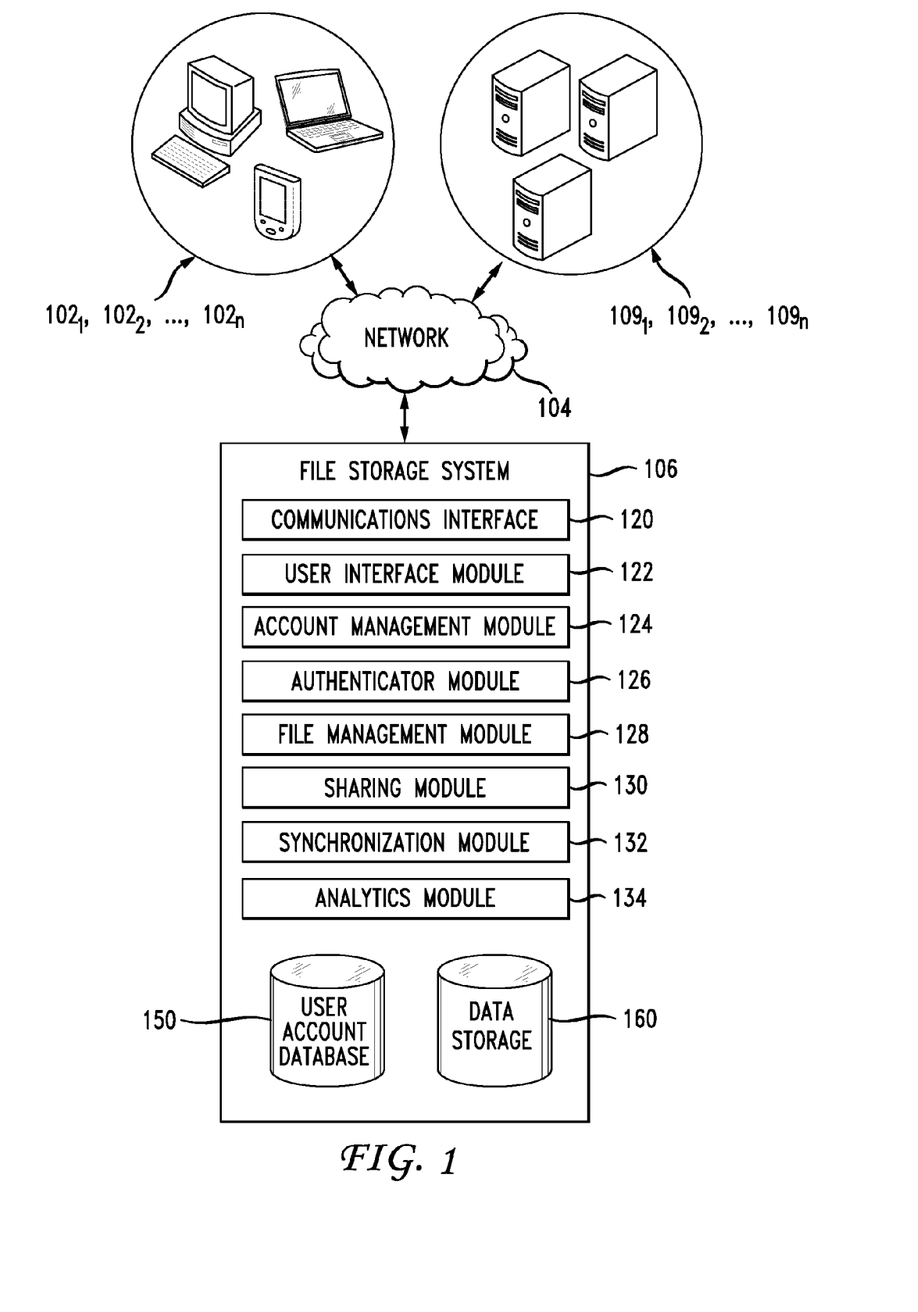
FIG. 1 shows an example configuration of devices and a network.

An exemplary system configuration 100 is shown in FIG. 1, wherein electronic devices communicate via a network for purposes of exchanging content and other data. The system can be configured for use on a wide area network such as that shown in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1, 102_2, \ldots, 102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1$, $109_2$, ..., $109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can include a content management module 128 for maintaining a content directory. The content directory can identify the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible. For example, the sharing module 130 may be an optional component if sharing data is not desired or necessary, or an additional component for interfacing with social networks may be included.

Figure 2:
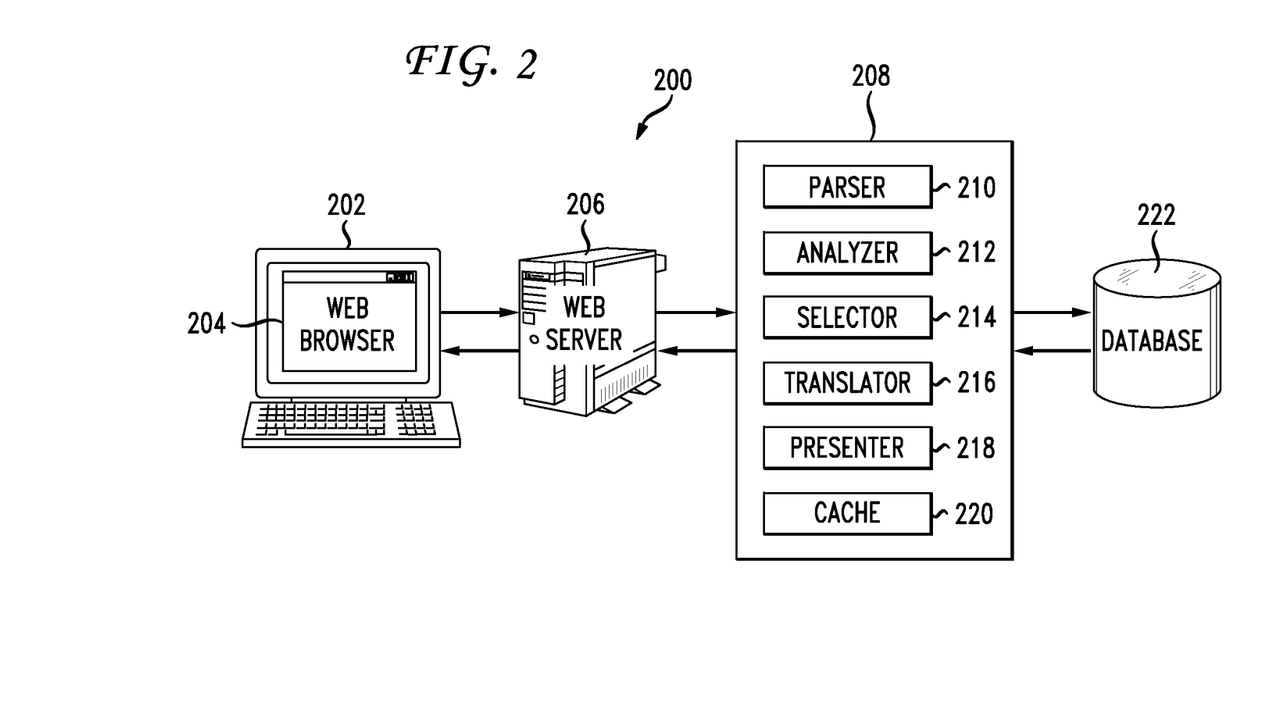
FIG. 2 shows an example configuration of a web server with a database interface.

Having discussed the basic architecture of content management system 106, the disclosure returns now to a discussion of a simplified and more flexible interface for handling incomplete database queries. FIG. 2 shows an example configuration 200 of a web server with a database interface. In this configuration 200, client device 202, such as a desktop computer, smartphone, or tablet computing device, can access web server 206 via web browser 204. Web server 206 can provide a web form to a user for submitting a database query through web browser 204. The user can fill out as many fields in the form as the user is able, and submit the form to web server 206 through web browser 204. Web server 206 can receive the form and can pass the submitted information to query processor 208. Query processor 208 can include modules such as parser 210, analyzer 212, selector 214, translator 216, presenter 218, and cache 220. Parser 210 can parse the submitted fields to extract relevant information. For example, simple parser 210 can split a comma-delimited list by dividing the list into elements using commas as boundaries, whereas a more complex parser 210 can apply natural language processing to the fields to determine what the user intended based on the information submitted through the web form.

After parser 210 extracts information from the query, analyzer 212 can determine which pieces of information are missing or incomplete. For example, analyzer 212 can apply one of a set of templates of properly formed queries to determine which pieces of information are missing. In another example, analyzer 212 can attempt to execute a query against database 222, and if the query is successful, query processor 208 can return those results to web browser 204. If the query is unsuccessful, analyzer 212 can examine any errors or messages from database 222 to determine which pieces of information are missing or incomplete. When missing information is identified, such as a particular data source or a date range, selector 214 can examine other information to determine what the value of the missing information should be. For example, selector 214 can determine based on a search history for that user that a missing or unspecified date range is likely to be the second quarter of 2012, and use appropriate date ranges for the query. After values for missing information are determined and optionally satisfy a data quality threshold, query processor 208 can store the determined values in cache 220 for reuse with the same or similar queries. The data quality threshold can be determined based on relevance of the results to the query, based on user input indicating quality of the query results, or based on observing user behavior. For example, if the user submits a first query, receives results from that query, and immediately afterwards submits a query that corrects a guessed value for a piece of missing information, the system can determine that the guessed value was incorrect and discard that value from the cache.

In some cases, the query is submitted in a generic format or in some other format incompatible with database 222. Translator 216 can adapt one or more portions of the query submitted from the user to be compatible with database 222. After query processor 208 appropriately submits the query to database 222 and receives results, presenter 218 can coordinate with web server 206 to present the results to the user through web browser 204. Presenter 218 can provide the results in other ways as well, such as sending an email with the results attached, or writing the query results in to a log file. In one example, presenter 218 can provide, in addition to query results, a complete version of the query that was submitted so that the user can view what changes or additions were made to the originally submitted query. In this case, the user can directly modify the complete version of the query and resubmit. This can serve as a way to train or teach users. A user may not know the format for a parameter or even that a particular parameter exists. However, when the user submits an incomplete query and can view a corresponding completed query, the user can learn how to submit better queries over time.

Figure 3:
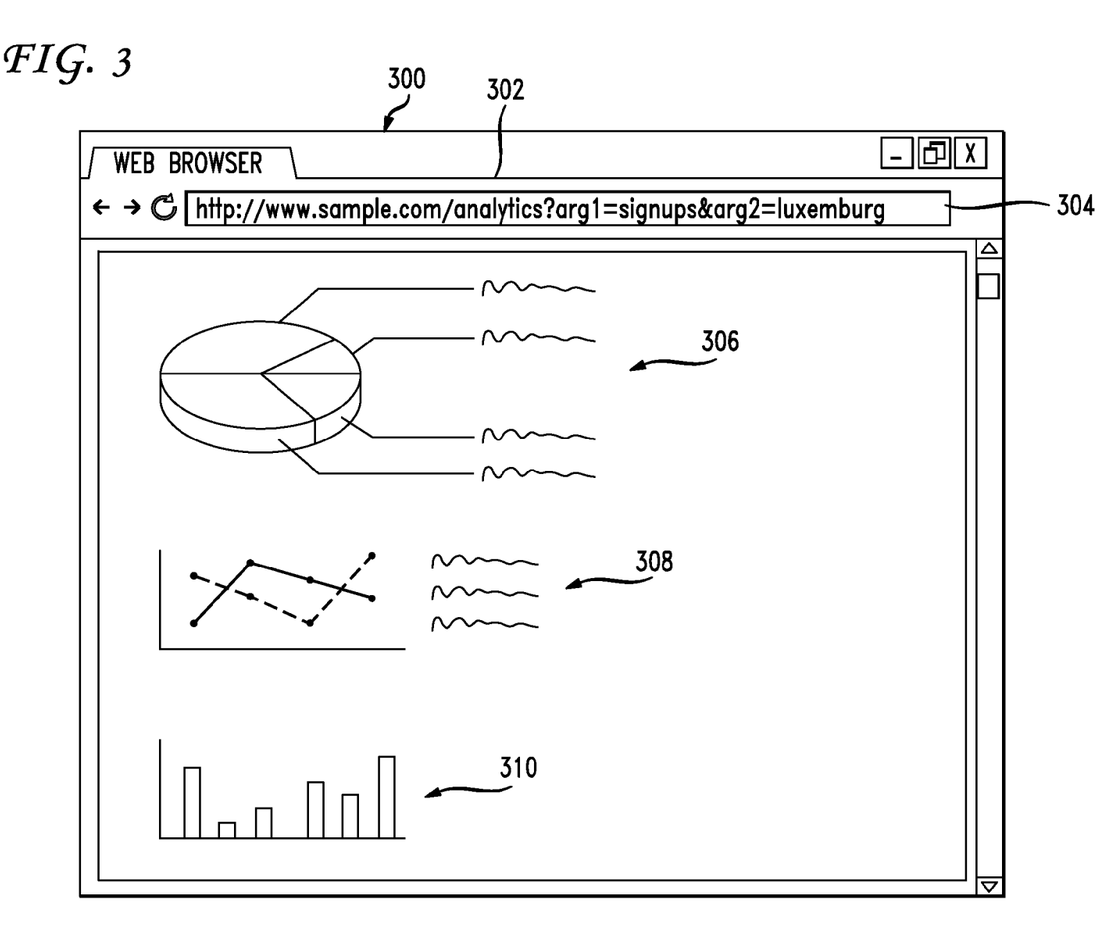
FIG. 3 shows an example web browser and uniform resource locator.

FIG. 3 shows an example web browser 300 with uniform resource locator (URL) 304 in address bar 302. In this example, the user submits a query as part of the URL, with the query parameters submitted as arguments in the URL. The user can manually enter the URL and arguments or the user can fill out a form to generate the URL. The URL can be programmatically generated on behalf of a user. When the URL including arguments is submitted to the web server, the web server serves a page in response, which includes at least part of the results of the query presented as various charts 306, 308, 310, tables, images, video, or other output formats. When the results reflect multiple different types of data, the page served in response can include multiple different types of charts for the different data types. The system can determine which types of charts to present to the user based on the resulting data set, or based on user preferences, non-query arguments in the URL, and so forth. The system can determine not only the type of the charts to use for presenting the results, but can also determine a layout of the web page. For example, the system can generate a particular two-column view when the results are easily divisible into two sections. As another example, the system can generate a broad chart at the top of the page, a more detailed chart below that, and an even more detailed chart below that. In one example, the system can generate multiple potential layouts based on the results, and provide the user with an option to switch between the multiple potential layouts. Then the user can 'pin' one of the potential layouts as a preferred layout for presenting later results. The page can display charts as text in a table, as static elements such as bitmap or vector images, or as dynamic or interactive elements such as components authored using Adobe® Flash® or Microsoft® Silverlight™. The system can present the query results in a native format, such as if the query results are video, the system can present one or more of the video results so the user can browse the videos.

Figure 4:
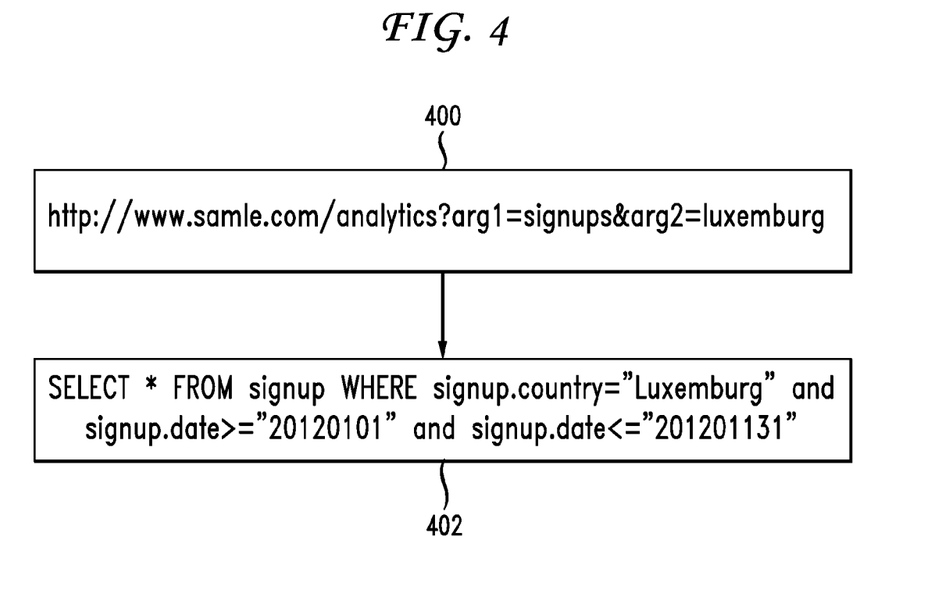
FIG. 4 shows an example conversion of a uniform resource locator to a database query.

FIG. 4 shows an example conversion of a uniform resource locator to a database query, such as translator 216 of FIG. 2 may perform. In this example, the user submits a URL 400 with a first argument of "signups" and a second argument of "Luxembourg". Translator 216 can convert those arguments, based on order or label, to specific fields in database query 402. In this example, the first argument "signups" is inserted into the SELECT FROM field, and the second argument is inserted into the WHERE signup.country=field. This example further shows the addition of a date range that was not specified in submitted URL 400.

Figure 5:
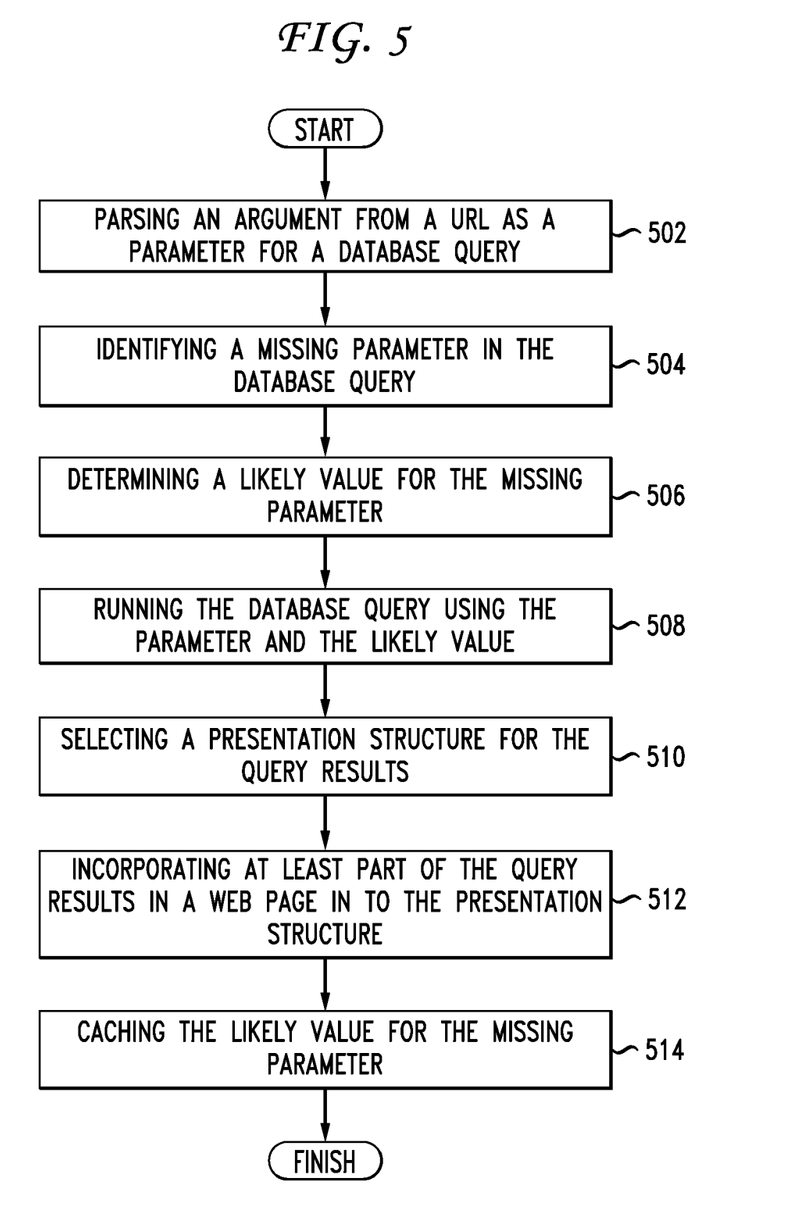
FIG. 5 shows an example method embodiment for executing a database query based on an incomplete query.

FIG. 5 shows an example method embodiment for executing a database query based on an incomplete query. An example system configured to practice the method can receive a web request, wherein a uniform resource locator (URL) of the web request provides an argument, and extract the argument from the URL as a parameter for a database query (502). Arguments can include database query parameters or parameters describing how to display results, such as a data type, a data category, a time window, a priority, a graph type, a chart type, a table type, or a database. The system can identify an unspecified parameter in the database query (504), and select a likely value for the unspecified parameter (506) based on at least one of a predefined rule, a heuristic, an analysis of a statistical model, or information contained in the web request. An example statistical model can be based on past user input, user feedback, or log data. The system can select the likely value for the unspecified parameter further based on a data source associated with the database query, such as a production system, a logging module, an analytics module, or some other external source.

Then the system can execute the database query using the parameter and the likely value (508) for the unspecified parameter to yield a query result, and incorporate at least part of the query result in a web page served in response to the web request (510). The system can optionally select a presentation structure for the query result within the web page (512). The presentation structure can include at least one of a number of a statistical graphical representation, a layout of the statistical graphical representation, whether to stack the statistical graphical representation, or a type of the statistical graphical representation such as a graph, chart, table, or list. The system can cache the web request and the likely value for the unspecified parameter for later use 514.

The query results can include additional data related to the web request but not specifically requested through the web request. The system can incorporate specifically requested query results in the web page so that more relevant data is presented in a more visible way than less relevant data, such as by presenting the relevant data in a larger chart, or placing the relevant data in a higher position on the web page.

Figure 6:
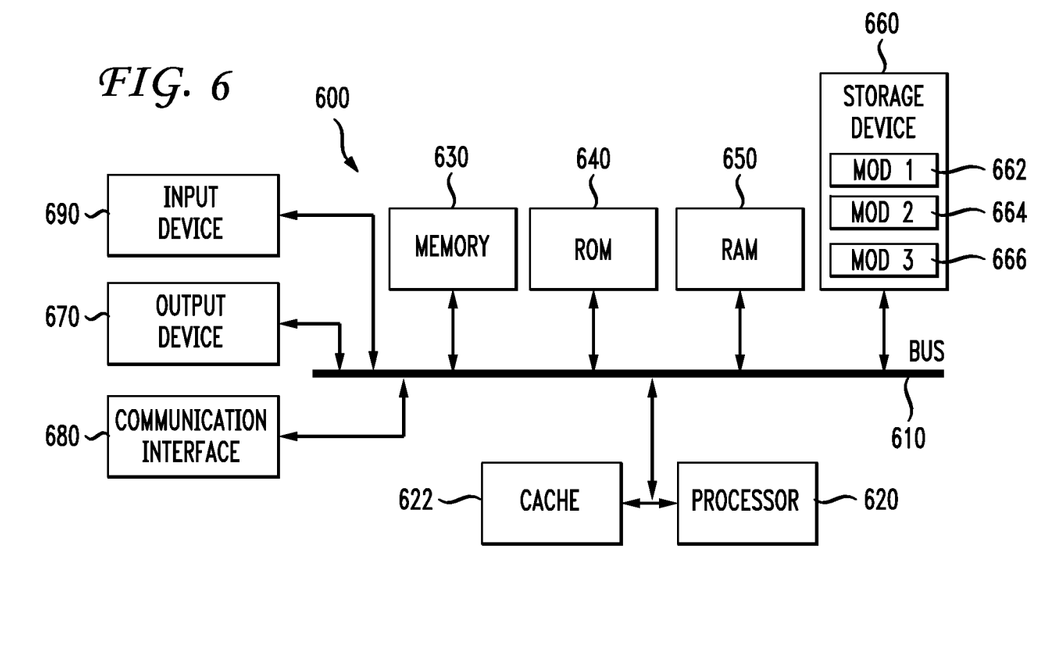
FIG. 6 shows an example conventional system bus computing system architecture.
Figure 7:
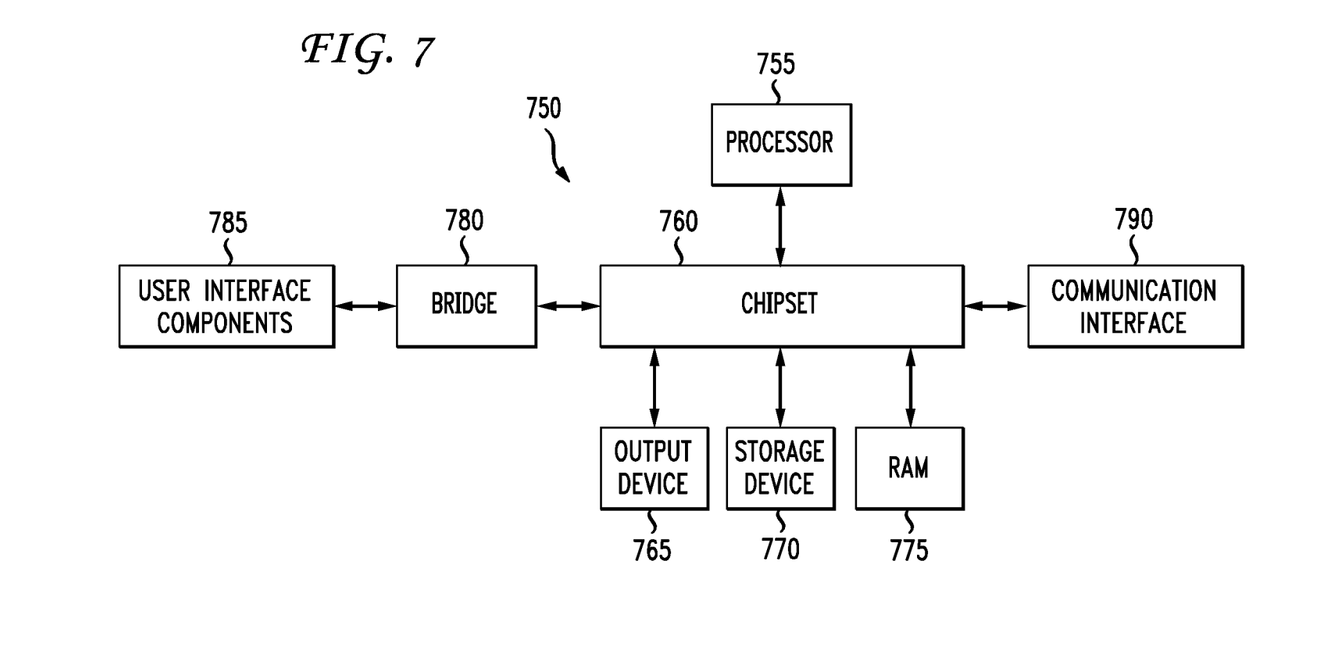
FIG. 7 shows an example computer system having a chipset architecture.

FIGS. 6 and 7 show exemplary possible system embodiments. The more appropriate embodiment will be apparent to those of ordinary skill in the art when practicing the present technology. Persons of ordinary skill in the art will also readily appreciate that other system embodiments are possible.

FIG. 6 shows a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 7 shows a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 600 and 750 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

I claim:

1. A system comprising:
a processor; and
a non-transitory computer-readable storage medium storing instructions which, when executed by the processor, cause the processor to perform a method comprising:
receiving a web request, wherein a uniform resource locator (URL) of the web request provides an argument and a user account identifier identifying a user account;
extracting the argument from the URL as a parameter for a database query;
identifying a plurality of unspecified parameters in the database query;
selecting a plurality of likely values for the plurality of unspecified parameters based on at least one of a predefined rule, a heuristic, an analysis of a statistical model, or information contained in the web request;
executing the database query, in the identified user account, using the parameter and the plurality of likely values for the plurality of unspecified parameters to yield a query result;
incorporating at least part of the query result in a web page served in response to the web request.

2. The system of claim 1, wherein the parameter is one of a data type, a data category, a time window, a priority, or a database.

3. The system of claim 1, the non-transitory computer-readable storage medium storing additional instructions which, when executed by the processor, causes the processor to perform the method further comprising:
requesting additional information, needed to select the plurality of likely values for the plurality of unspecified parameters, from a user who made the web request.

4. The system of claim 1, wherein the plurality of likely values for the plurality of unspecified parameters is selected further based on a data source associated with the database query.

5. The system of claim 1, wherein the statistical model is based on at least one of past user input, user feedback, or log data.

6. A computer-implemented method comprising:
receiving a web request, wherein a uniform resource locator (URL) of the web request provides an argument and a user account identifier identifying a user account;
extracting the argument from the URL as a parameter for a database query;
identifying an unspecified parameter in the database query;
selecting, via a processor, a likely value for the unspecified parameter based on at least one of a predefined rule, a heuristic, an analysis of a statistical model, or information contained in the web request;
executing the database query, in the identified user account, using the parameter and the likely value for the unspecified parameter to yield a query result; and
incorporating at least part of the query result in a web page served in response to the web request.

7. The computer-implemented method of claim 6, wherein the argument is one of a data type, a data category, a time window, a priority, a graph type, a chart type, a table type, or a database.

8. The computer-implemented method of claim 6, wherein the likely value for the unspecified parameter is selected further based on a data source associated with the database query.

9. The computer-implemented method of claim 8, wherein the data source is one of a production system, a logging system, an analytics system, or an external source.

10. The computer-implemented method of claim 6, wherein the statistical model is based on at least one of past user input, user feedback, or log data.

11. The computer-implemented method of claim 6, further comprising selecting a presentation structure for the query result within the web page, wherein the presentation structure comprises at least one of a number of a statistical graphical representation, a type of the statistical graphical representation, a layout of the statistical graphical representation, or whether to stack the statistical graphical representation.

12. The computer-implemented method of claim 6, wherein the statistical graphical representation is one of a graph, a chart, a table, or a list.

13. The computer-implemented method of claim 6, further comprising caching the web request and the likely value for the unspecified parameter for later use.

14. The computer-implemented method of claim 6, wherein the query result includes additional data related to the web request but not specifically requested through the web request.

15. The computer-implemented method of claim 6, wherein the query result is incorporated in the web page in such a way that more relevant data is presented in a more visible way than less relevant data.

16. The computer-implemented method of claim 6, wherein the web page provides a dashboard interface.

17. The computer-implemented method of claim 6, wherein the URL of the web request provides a plurality of arguments, the method further comprising:
extracting each of the plurality of arguments from the URL as parameters for the database query.

18. A non-transitory computer-readable medium storing computer executable instructions for causing a computer to perform a method comprising:
receiving a web request, wherein a uniform resource locator (URL) of the web request provides a plurality of arguments and a user account identifier identifying a user account;
extracting the plurality of arguments from the URL as a plurality of parameters for a database query;
identifying an unspecified parameter in the database query;
selecting a likely value for the unspecified parameter based on at least one of a predefined rule, a heuristic, an analysis of a statistical model, or information contained in the web request; executing the database query, in the identified user account, using the plurality of parameters and the likely value for the unspecified parameter to yield a query result;
incorporating at least part of the query result in a web page served in response to the web request.

19. The non-transitory computer-readable storage medium of claim 18, wherein the instructions further cause the computer to perform the method comprising:
selecting a presentation structure for the query result within the web page, wherein the presentation structure comprises at least one of a number of a statistical graphical representation, a type of the statistical graphical representation, a layout of the statistical graphical representation, or whether to stack the statistical graphical representation, wherein the statistical graphical representation is one of a graph, a chart, a table, or a list.

20. The non-transitory computer-readable storage medium of claim 18, wherein the query result is incorporated in the web page in such a way that more relevant data is presented in a more visible way than less relevant data.

* * * * *